UNITED STATES PATENT OFFICE.

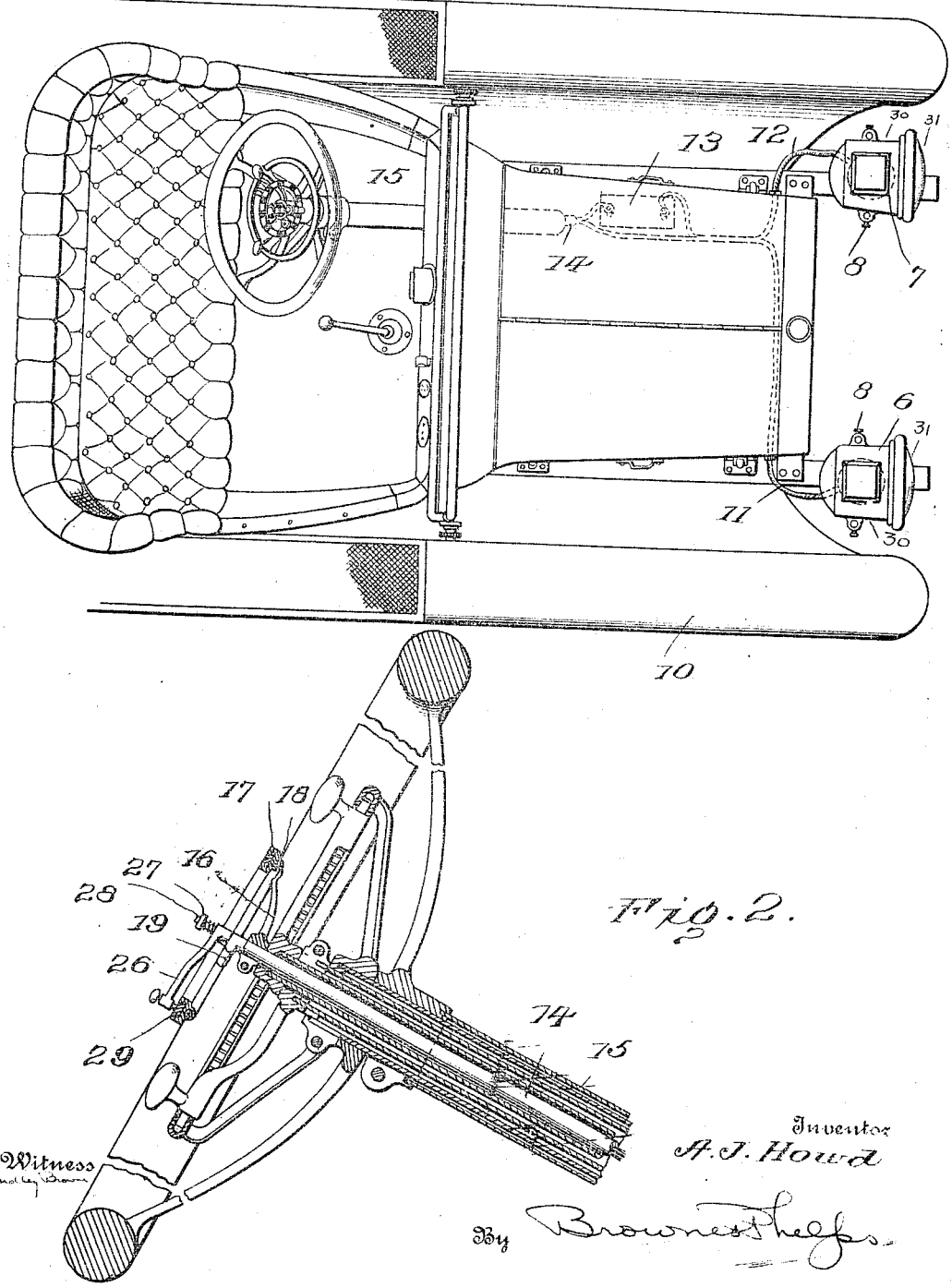

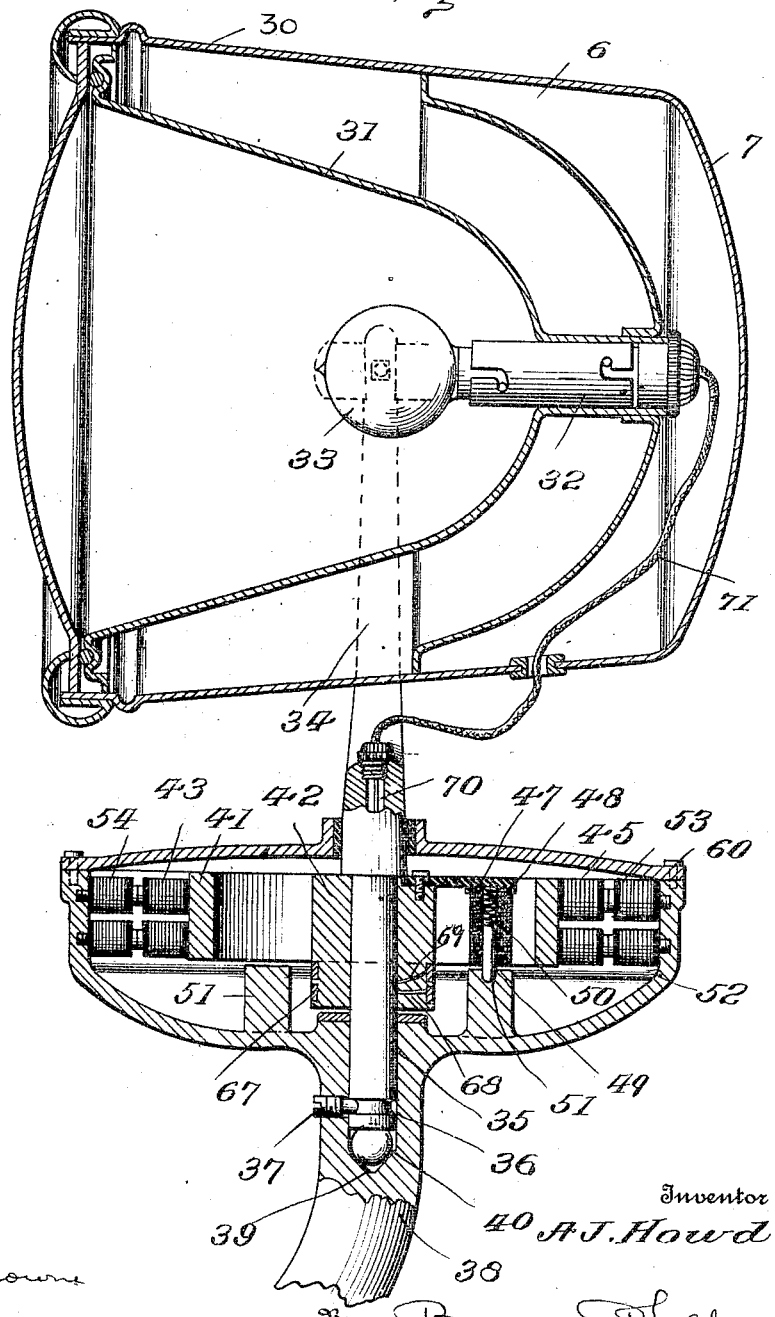

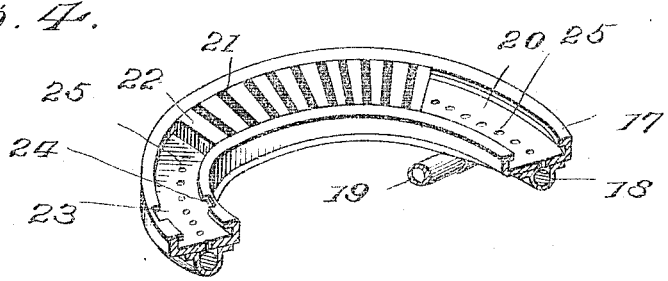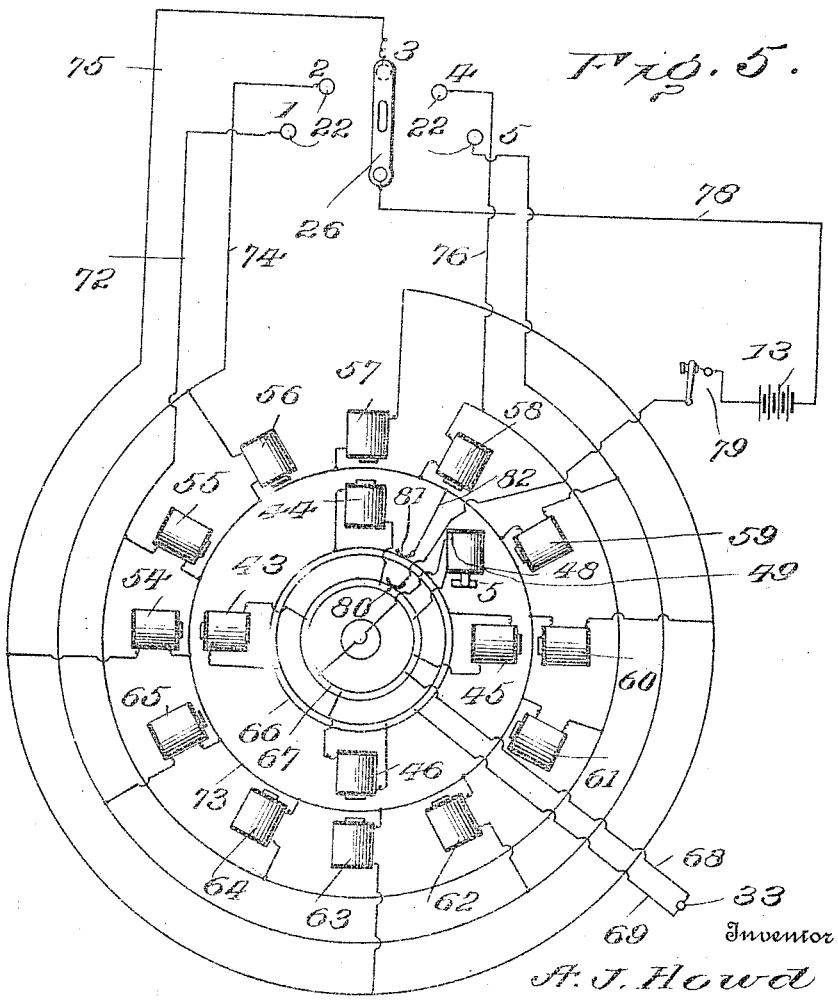

ALVAH JEWEL HOWD, OF NAMPA, IDAHO.

DIRIGIBLE HEADLIGHT.

1,284,345.  Specification of Letters Patent.  Patented Nov. 12, 1918.

Application filed April 4, 1917. Serial No. 159,612.

*To all whom it may concern:*

Be it known that I, ALVAH JEWEL HOWD, a citizen of the United States, residing at Nampa, in the county of Canyon and State of Idaho, have invented certain new and useful Improvements in Dirigible Headlights, of which the following is a specification.

This invention relates to dirigible mountings for search lights and more particularly to that class of such devices as are essentially adapted to operate dirigible headlights for automobiles or the like in order to project a beam of light at any desired angle to the path of direction of the vehicle to illuminate any deviation of the roadway from a straight line, and the invention has for its primary object the provision of a device of the character set forth which shall be operable at the will of the vehicle driver in order to produce the desired result.

A further object of the present invention is to construct a dirigible headlight in which the electric current used to energize the light giving medium employed therein is also utilized to rotate the headlight mounting to the desired position.

A still further provision of the herein described invention consists in the employment of locking means for the mounting to prevent rotation thereof when the operating mechanism is not in use.

With the foregoing objects in view, and others as will from time to time hereinafter appear in the description to follow, this invention consists in the peculiar combination and arrangement of the various coöperating elements of a dirigible headlight as set forth in the accompanying specification and more particularly pointed out in the appended claims.

Referring to the drawings forming a portion of this specification and in which the same reference characters indicate the same parts wherever used, Figure 1 is a fragmentary plan view showing the installation of the device upon an automobile;

Fig. 2 is a section through the steering column thereof;

Fig. 3 is a section through the headlight mounting;

Fig. 4 is a detail perspective showing a portion of the switch contact rail and

Fig. 5 is a diagrammatic view of the electrical connections for the device.

6 and 7 designate respectively electric search lights of any suitable construction to be used as vehicle headlights and mounted in brackets 8—9 on the forward portion of an automobile designated as a whole by the numeral 10 and having electrical connections carried in conduits 11 and 12 extending to a battery 13 and upwardly through a tube 14 inclosed by the steering column 15. The tube 14 has a bracket 16 thereon which supports a ring 17 comprising a conduit 18 connected with the tube 14 by an extension 19 and a slot 20 adapted to receive alternate blocks of insulating material 21 and contact points 22, these blocks being inserted by means of notches 23—24 in the periphery of the ring 17. Electrical connections from the conduit 18 extend through apertures 25 in the ring 17 and are suitably secured to the contact points 22 in any usual manner.

A switch arm 26 is mounted on the tube 14 and is held by a spring 27 confined by a cap 28 in order to permit the arm 26 to be lifted off of the plates 22 and rotated to a second point without contacting with intermediate contacts. The contact portion 29 of the arm 26 is wide enough to bridge one insulating block 21 in order to contact with two members 22 at the same time for a purpose hereinafter set forth.

Each of the headlights comprises a casing 30, a reflector 31, lamp socket 32 and bulb 33, the casing 30 being supported by a U member 34 having an extension 35 provided with an annular groove 36 engaged by a screw member 37 carried by a support 38 recessed at 39 to receive the extension 35 and rotatably supporting the same by a ball bearing 40.

The member 35 has keyed thereon an annulus 41 having a hub 42, the exterior periphery of the annulus supporting a plurality of electromagnets 43—44—45 and 46, preferably of the horseshoe form, as illustrated.

On the hub 42 is a member 47 upon which is a solenoid 48 carrying a plunger 49 normally held in engagement by means of a spring 50 with a notched annular boss 51 upon a casing extension 52 integral with the support 38 and forming with a cover 53 a housing for the annulus 41 and the parts coöperating therewith.

The casing 52 carries a plurality of electromagnets 54—55—56—57—58—59—60—61—62—63—64— and 65, preferably of horseshoe form and alining with the electromagnets carried by the annulus 41.

The hub 42 is provided with contact rings 66—67 to which are attached wires 68—69 carried by a conduit 70 and a cable 71 to the lamp 33.

The electrical circuits are as follows:

In order to permit of a clear showing the number of contact points 22 is reduced to five in the wiring diagram and the number of electromagnets equally lessened.

Beginning with the extreme left hand contact point 22 a wire 72 connects in multiple the electromagnets 55—64—61 and 58 the circuit being completed by a trunk wire 73. A second wire 74 from the second contact point 22 connects in multiple the electromagnets 56—65—62 and 59 which are also in circuit with the wire 73, while the third contact point 22 is connected with the electromagnets 54—63—60 and 57 by means of a wire 75, this set of electromagnets being also in contact with the wire 73. Point 22 number four is in circuit 72 by a wire 76 and contact point 22 number 5 is connected with the wire 74 by a connection 77.

The switch arm 26 carries a wire 78 in series connection with the battery 13 or other suitable source of electrical energy and is broken by a single throw switch 79 of any proper construction, connection being had with the contact ring 67 by a brush 80. A second brush 81 carries a wire 82 connected to trunk wire 73, the brush 81 contacting with the contact ring 66.

The solenoid 48 is connected in series with the contact ring 67.

The operation of the device is as follows: In the wire diagram shown in Fig. 5 the switch arm 26 is illustrated as being on third contact point 22, when the electric current will be established as follows, assuming that the switch 79 is in closed position. The current from the battery 13 will flow through switch 79, the wire 78, the brush 80, contact ring 67, electromagnet 48, wire 73, wire 75 and electromagnets 54, 63, 60 and 57, energizing these electromagnets and causing them to attract the electromagnets carried by the annulus 41, causing a rotation of said annulus to a point where the electromagnets carried thereby will aline with the energized electromagnets carried upon the casing 52, at the same time causing the solenoid 48 to lift the pin 49 against the action of the spring 50 from out of the notch member 51, permitting the annulus to rotate, and causing a current to be transmitted through the wires 68 and 69, contacting with the rings 66 and 67 to permit a flow of current to the lamp 33. Should it be desired to move the headlight to any other position, the switch arm may be shifted to either points 1, 2, 4 or 5, whereupon a corresponding flow of current will ensue in the circuits connected with said contact points and corresponding electromagnets energized and the annulus rotated until such a time as the attracted electromagnets aline with the energized electromagnets, thus carrying the headlight around to the desired position where it will be held, due to the attraction of the energized electromagnets in the cylinders carried by the annulus 41.

When it is desired to lock the headlight in non-rotatable position the contact arm 26 is placed upon the contact point which corresponds to a longitudinal position of the head light when the switch 79 is operated to break the circuit which deënergizes the solenoid 48 and permits the spring 50 to force the member 49 into the notch carried by the member 51 to lock the annulus 41 with said member 51 and prevent any rotation thereof. By these means a degree of angular adjustment of the headlight is obtained which corresponds in position to the contact blocks carried upon the steering wheel, thus enabling the driver of the vehicle to place his headlight in any desired position to cause a beam of light upon any curve in the road.

It will be noted that the rotatable magnets 43—44—45—46 constitute in effect the armature magnets of a motor, while each series of magnets, as for instance the series consisting of magnets 54—63—60 and 57, constitute field magnets therefor.

It will also be seen that these field magnets are arranged in a plurality of series, each series being connected to a separate feed wire, and that the magnets are arranged in sets, each set being composed of a magnet of each series.

Reference was previously made to the fact that the contact end of the arm 26, was wide enough to bridge two contacts. This enables the current to be shifted gradually from the magnets of one series to the next adjacent magnets of a series without breaking the circuit through the locking solenoid 48, and causing the headlight to lock, between each completion of a circuit, and further the headlight will turn as the arm 26 is turned.

The device as illustrated while primarily designed to form a dirigible headlight for an automobile or similar vehicle, may be utilized wherever it is desired to use a dirigible headlight.

Having thus described my invention what I claim is:

1. A dirigible headlight, a series of magnets mounted for rotation, and operatively connected to the headlight to rotate therewith, a series of coacting fixed magnets, and means for selectively energizing any of the fixed magnets.

2. A dirigible headlight, a series of magnets mounted for rotation, and operatively connected to the headlight to rotate therewith, a series of coacting fixed magnets, and means for selectively energizing any of the fixed magnets and for simultaneously energizing all of the rotatable magnets.

3. A rotatably mounted headlight, a plurality of radially disposed electro-magnets mounted to rotate with the headlight, a plurality of series of coacting electro-magnets, arranged concentrically to the first named magnets, the series of second named magnets being arranged in sets, each set consisting of a magnet of each series, and means for establishing a circuit through the magnets of any series.

4. A dirigible headlight, a plurality of series of electro-magnets arranged in sets, each set having therein one magnet of each series, a plurality of attracted elements, equal in number to the number of series of electro-magnets, and carried by and rotatable with the headlight, and means for selectively energizing any series of magnets.

5. A dirigible headlight, a series of magnets mounted for rotation with the headlight, a plurality of series of coacting fixed magnets, and means for selectively energizing the fixed magnets of any series, and all of the rotatable magnets, comprising a source of electrical energy connected on one side separately to each series of fixed magnets, and to the rotatable magnets, a plurality of spaced, insulated contacts equal in number to the number of series of magnets, and each electrically connected to a corresponding series, and an arm having engagement at one end with any contact and electrically connected to the other side of the battery.

6. A dirigible headlight, electrically operated means for swinging the headlight, and means for locking the headlight including a locking bolt, and an electromagnet for retracting the bolt and energized upon the energizing of the operating means.

7. A dirigible headlight, a plurality of electro-magnets carried thereby and rotating therewith, a plurality of series of electro-magnets arranged concentrically to the first named magnets, and arranged in sets, each set having therein an electro-magnet from each series, a locking bolt, a solenoid therefor, and manually controlled means for simultaneously energizing any series of second named magnets, all of the first-named magnets, and the solenoid.

In testimony whereof I affix my signature in presence of two witnesses.

ALVAH JEWEL HOWD.

Witnesses:
Geo. F. Robinson,
Chas. F. Anderson.